(12) United States Patent
Hasegawa

(10) Patent No.: US 6,736,047 B2
(45) Date of Patent: May 18, 2004

(54) POWER STEERING DEVICE

(75) Inventor: Yosuke Hasegawa, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 75 days.

(21) Appl. No.: 09/961,275

(22) Filed: Sep. 25, 2001

(65) Prior Publication Data
US 2002/0038739 A1 Apr. 4, 2002

(30) Foreign Application Priority Data

Sep. 29, 2000 (JP) .......................... 2000-301376
Jun. 15, 2001 (JP) .......................... 2001-181172

(51) Int. Cl.$^7$ ................................. B62K 5/08
(52) U.S. Cl. ................. 91/376 A; 91/375 R; 91/370
(58) Field of Search .................. 91/370, 371, 372, 91/373, 375 R, 376 A; 137/625.21, 625.23

(56) References Cited

U.S. PATENT DOCUMENTS 2,260,979 A * 10/1941 Morin et al. .............. 91/375 R
2,939,428 A * 6/1960 Ostwald .................... 91/376 A
3,939,756 A * 2/1976 Saida et al. ............... 91/376 A
5,975,136 A * 11/1999 Heitzer ..................... 91/375 R

* cited by examiner

Primary Examiner—Thomas E. Lazo
(74) Attorney, Agent, or Firm—Birch, Stewart, Kolasch & Birch, LLP

(57) ABSTRACT

A power steering device includes a cylindrical holder coaxially arranged on a steering shaft, a cylindrical rotary cylinder coaxially and rotatably installed in the holder and forming two oil chambers spaced apart in a circumferential direction between it and an inner surface of the holder, and a spool changing-over member coaxially and rotatably inserted in the rotary cylinder and connected to the steering wheel. A differential mechanism is provided between the rotary cylinder and the spool changing-over member for integrally rotating the rotary cylinder and the spool changing-over member when a steering force applied to the steering shaft is low, and allowing a relative rotation between the rotary cylinder and the spool changing-over member when the steering force is larger than a predetermined value.

20 Claims, 9 Drawing Sheets

POWER STEERING DEVICE

This nonprovisional application claims priority under 35 U.S.C. §119(a) on Patent Applications No. 2000-301376 and 2001-181172 filed in Japan on Sep. 29, 2000 and Jun. 15, 2001, respectively, which are herein incorporated by reference.

BACKGROUND OF THE INVENTION

1. Field of the Invention

The present invention relates to a power steering device installed on a vehicle.

2. Description of the Background Art

A power steering device of the background art is shown in FIG. 9, which includes a power assisting cylinder 3 arranged between a steering shaft 1 and a chassis frame 2, a control valve 4 operated by the steering shaft 1 to control the power assisting cylinder 3, an oil pump 5 for pressurizing the operating oil supplied to the power assisting cylinder 3, and an oil tank 6 for storing the operating oil. The oil pump 5, the oil tank 6 and the control valve 4 are connected to each other through three oil pipes 7. In addition, the steering shaft 1 is provided with a spool lever 8 for operating the control valve 4, and a center arm 9 oscillated by the power assisting cylinder 3.

The background art power steering device constituted as described above is operated such that when the steering shaft 1 is turned in any of the rightward or leftward direction, the control valve 4 is operated by the spool lever 8, so that operating oil is supplied to the power assisting cylinder 3. Then, the center arm 9 is oscillated in the turning direction of the steering shaft 1 under an operation of the power-assisting cylinder 3, and the operating force of the steering shaft 1 is reduced.

In the aforesaid background art, the power assisting cylinder and the control valve 4 are arranged at a side of the steering shaft 1, and they are connected to the steering shaft 1 by the spool lever 8 and the center arm 9, so that the background art has a problem that the entire system becomes large in size and a certain accuracy is required in connecting each of the component parts, as well as the assembling work involved.

SUMMARY OF THE INVENTION

The present invention has been invented in view of the problems found in the background art, and it is an object of the present invention to provide a power steering device which saves space and is easy to assemble.

The power steering device of the present invention is installed between a steering shaft rotatably installed at a chassis frame and a steering wheel connected to the steering shaft. The power steering device comprises a cylindrical holder coaxially arranged on the steering shaft, a cylindrical rotary cylinder coaxially and rotatably installed in this holder and forming two oil chambers spaced apart in a circumferential direction between it and an inner surface of the holder, and a spool changing-over member coaxially and rotatably inserted in the rotary cylinder and connected to the steering wheel.

The holder is provided with an operating oil supply hole and an operating oil discharging hole. The rotary cylinder is formed with a pair of communicating holes between each of the oil chambers and an inside of the rotary cylinder. The spool changing-over member is formed with operating oil passages where a space part between it and an inner circumferential surface of the rotary cylinder is divided into two segments in a circumferential direction and connected with the supply holes and discharging holes. A pair of partition walls are provided for changing-over a communicating state between the pair of operating oil passages and the pair of communicating holes under relative rotation with the rotary cylinder.

The power steering device of the present invention is characterized in that the both operating oil passages are connected with the spool changing-over member, and there is provided a check valve for preventing a flow of operating oil directed from the operating oil passages connected with the supply hole for the operating oil and directed toward the operating oil passage connected with the discharging hole for the operating oil.

The power steering device of the present invention is characterized in that there is provided between the rotary cylinder and the spool changing-over member a differential mechanism for integrally rotating the rotary cylinder and the spool changing-over member, when a steering force applied to the steering shaft is low, and when the steering force is larger than a predetermined value in a case of allowing a relative rotation between the rotary cylinder and the spool changing-over member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
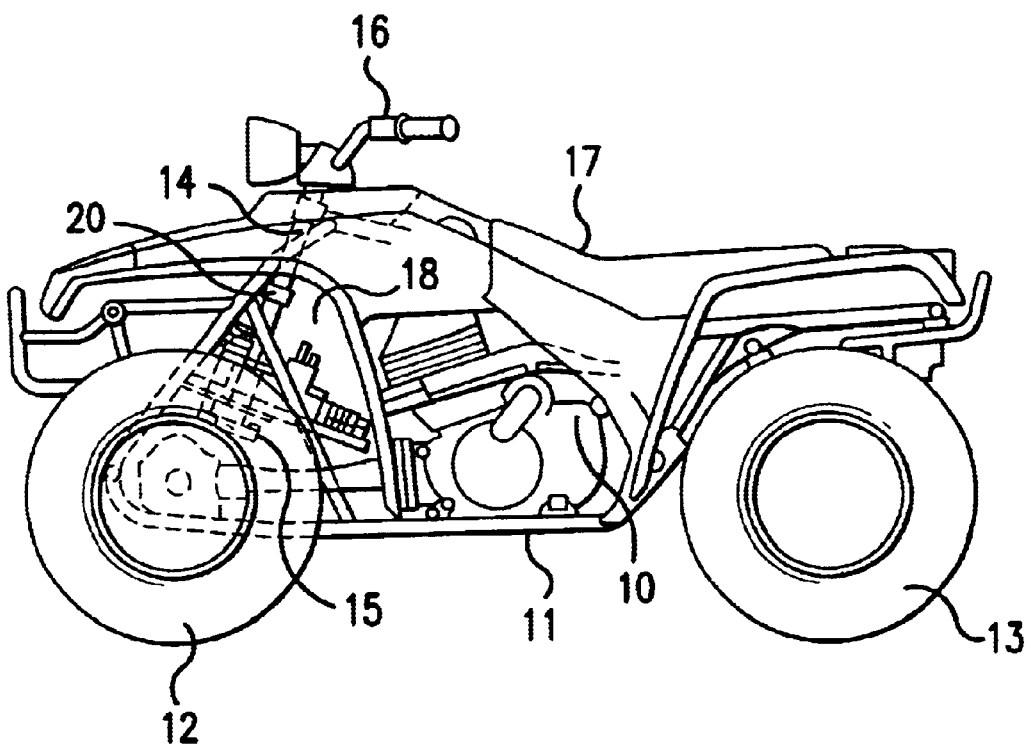
FIG. 1 is a side elevational view showing a cross-country running vehicle to which one preferred embodiment of the present invention is applied.

Referring now to the drawings, a preferred embodiment of the present invention will be described in detail. FIG. 1 illustrates a saddle type vehicle to which the preferred embodiment of the present invention is applied. A pair of front wheels 12 and a pair of rear wheels 13 are supported in forward or rearward and rightward or leftward directions of a chassis frame 11 having an engine 10 mounted at a central part of the chassis. A steering shaft 14 is pivotally installed at the front part of the chassis frame 11. A steering arm 15 connects each of the front wheels 12 acting as steering wheels with the steering shaft 14. A steering wheel 16 is installed at the upper part of the steering shaft 14. A seat 17 is installed at the chassis frame 11 at a rear position of the steering wheel 16. A power steering device is installed midway along the steering shaft 14.

Figure 2:
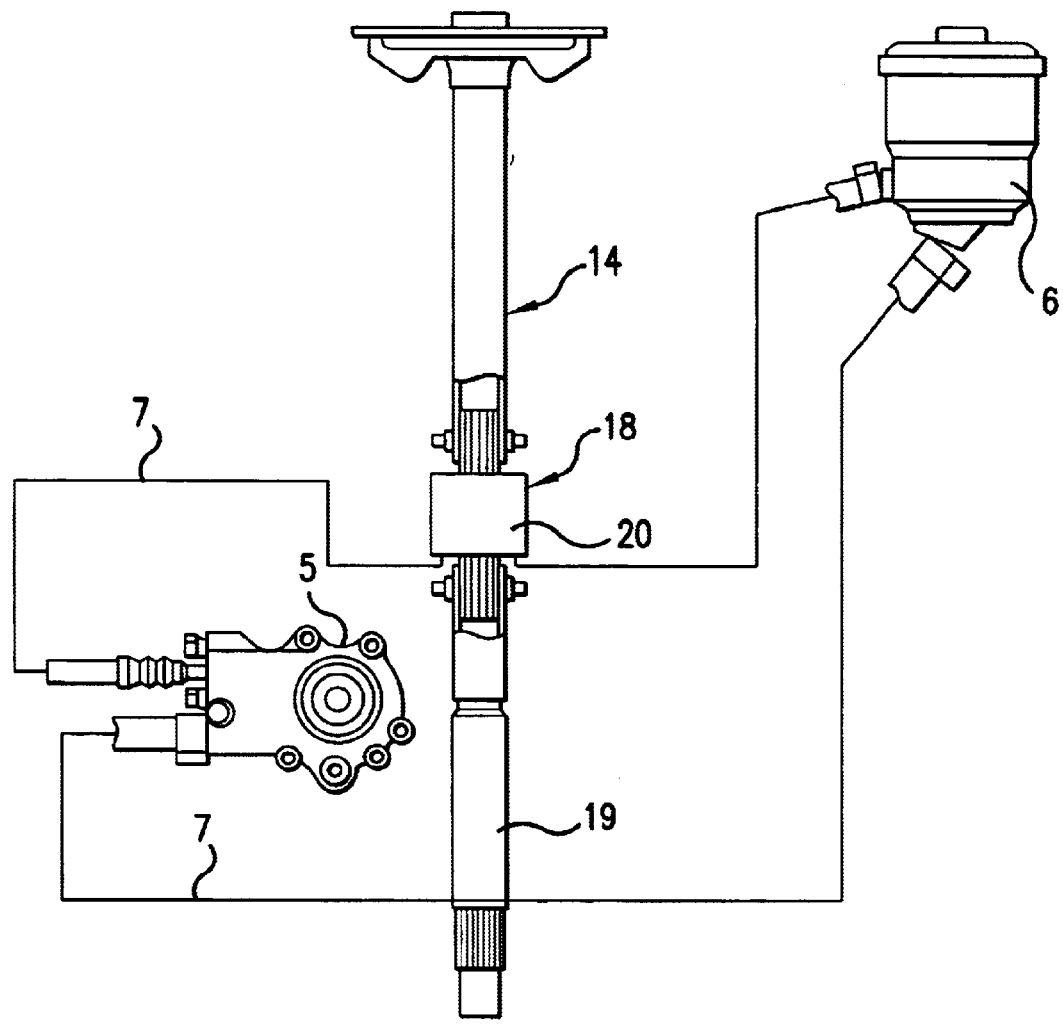
FIG. 2 is a system configuration view showing one preferred embodiment of the present invention.
Figure 3:
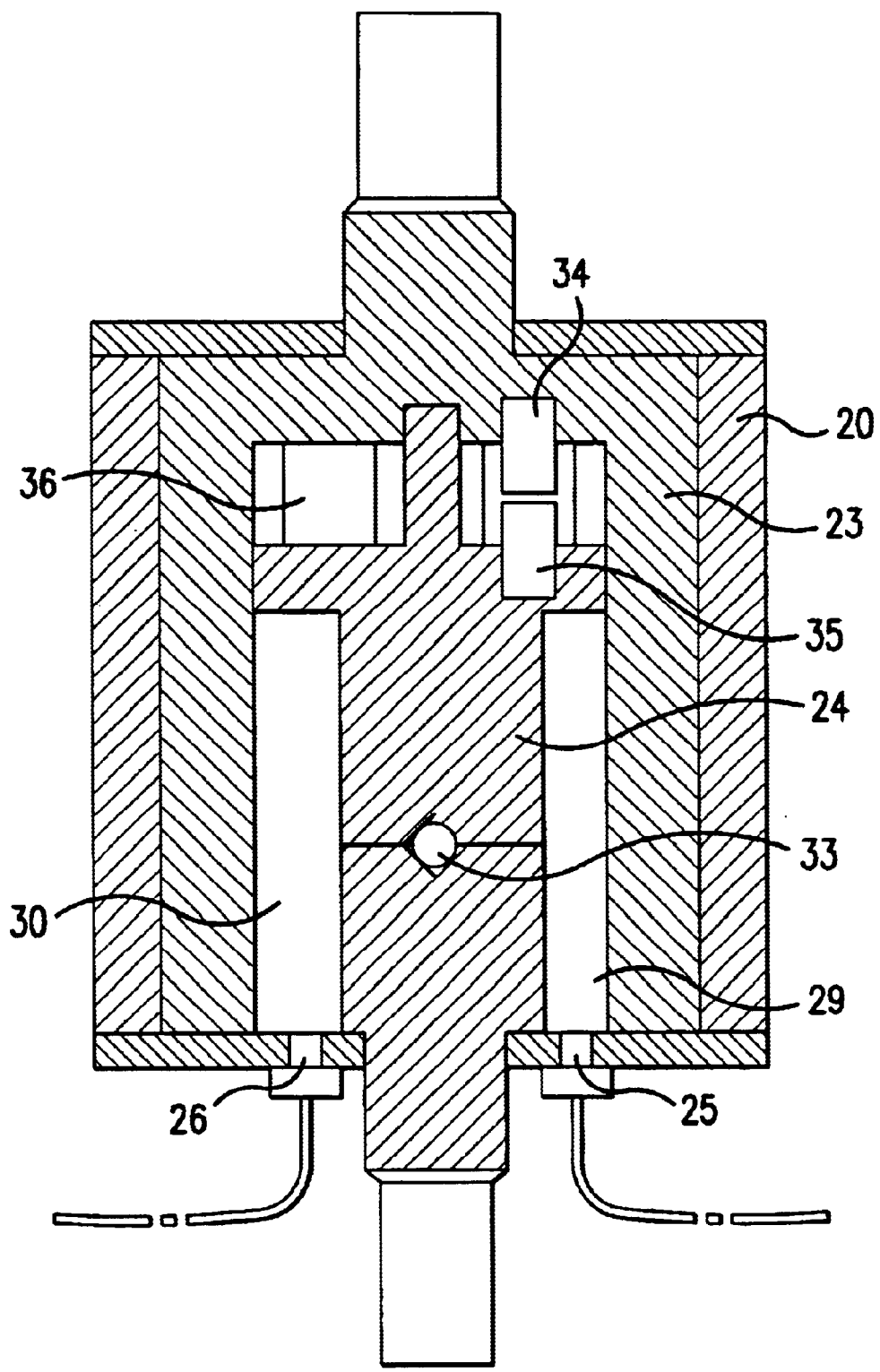
FIG. 3 is a longitudinal sectional view showing a substantial part to illustrate one preferred embodiment of the present invention.

To the lower part of the steering shaft 14 is cooperatively arranged an output shaft 19 to which the steering arm 15 is fixed as shown in FIG. 2, and the power steering device 18 is installed at a connecting part between the output shaft 19 and the steering shaft 14.

As shown in FIG. 2, the power steering device 18 includes a cylindrical holder 20 coaxially arranged on the steering shaft 14. A cylindrical rotary cylinder 23 is coaxially and rotatably installed in the holder 20, and forms two oil chambers 21, 22 (refer to FIG. 4) spaced apart in a circumferential direction between it and the inner surface of the holder 20. A spool changing-over member 24 is coaxially and rotatably inserted into the rotary cylinder 23 and connected to the steering shaft 14. The holder 20 is provided with an operating oil supply hole 25 and an operating oil discharging hole 26. The rotary cylinder 23 is formed with a pair of communicating holes 27, 28 connected with each of the oil chambers 21, 22 and the inner side of the rotary cylinder 23.

The spool changing-over member 24 is formed with operating oil passages 29, 30 dividing a space between it and the inner circumferential surface of the rotary cylinder 23 into two segments in a circumferential direction and connected with the supply hole 25 and the discharging hole 26. The spool changing-over member is provided with a pair of partition walls 31, 32 changing-over the communicating state between the pair of operating oil passages 29, 30 and the pair of communicating holes 27, 28 under relative rotation of the rotary cylinder 23. The spool changing-over member 24 is provided with a check valve 33 to cause both operating oil passages 29, 30 to be connected to each other and in turn to prevent a flow of operating oil from the operating oil passage 29 connected with the supply hole 25 for the operating oil toward the operating oil passages 30 connected with the discharging hole 26 for the operating oil.

The rotary cylinder 23 is provided with a protruding pin 34 along an axial direction thereof, and the spool changing-over member 24 is provided with a pin 35 positioned on the same axis of the pin 34. The spool changing-over member 24 is provided at its circumference with a C-ring 36 which can be deformed resiliently in its diameter direction. Each of the pins 34, 35 is engaged with the discontinuous part of the C-ring 36.

The end portions of the discontinuous part of the C-ring 36 are abutted with both pins 34, 35, and when the operating force of the steering shaft 14 is low, the rotary cylinder 23 and the spool changing-over member 24 are integrally rotated. However, when the operating force becomes more than a torque set in reference to a modulus of elasticity of the C-ring 36, the C-ring 36 is deformed and pushed open, so that the rotary cylinder 23 and the spool changing-over member 24 may be relatively rotated. A differential mechanism in the preferred embodiment is constituted by these two pins 34, 35 and the C-ring 36.

Figure 5:
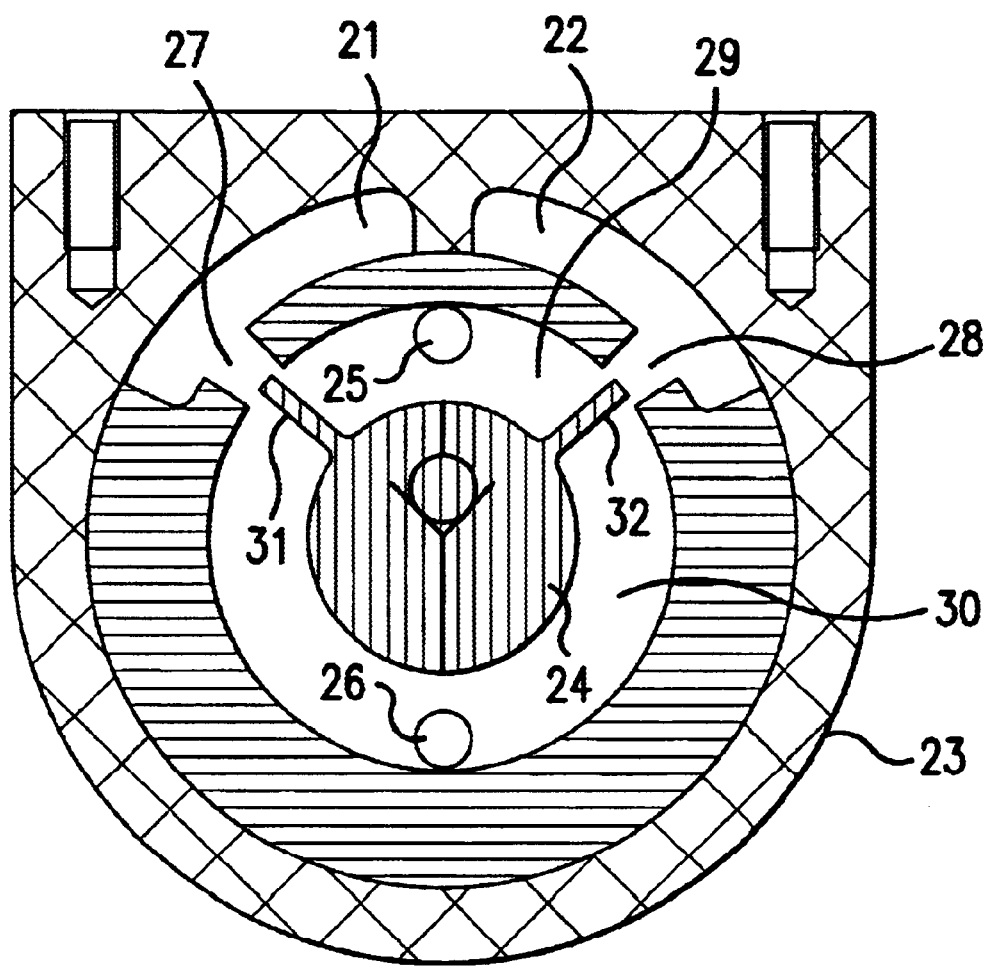
FIG. 5 is a cross sectional view showing a substantial part to illustrate an operation of one preferred embodiment of the present invention.

The operation of the preferred embodiment constructed as described above will be described as follows. At first, under a state in which no steering operation is carried out, each of both partition walls 31, 32 is oppositely faced against the central part of the communicating holes 27, 28 as shown in FIG. 5, thereby both operating oil chambers 21, 22 are connected with both operating oil passages 29, 30. Accordingly, no assisting force is produced under a released state of both operating oil chambers 21, 22.

Figure 4:
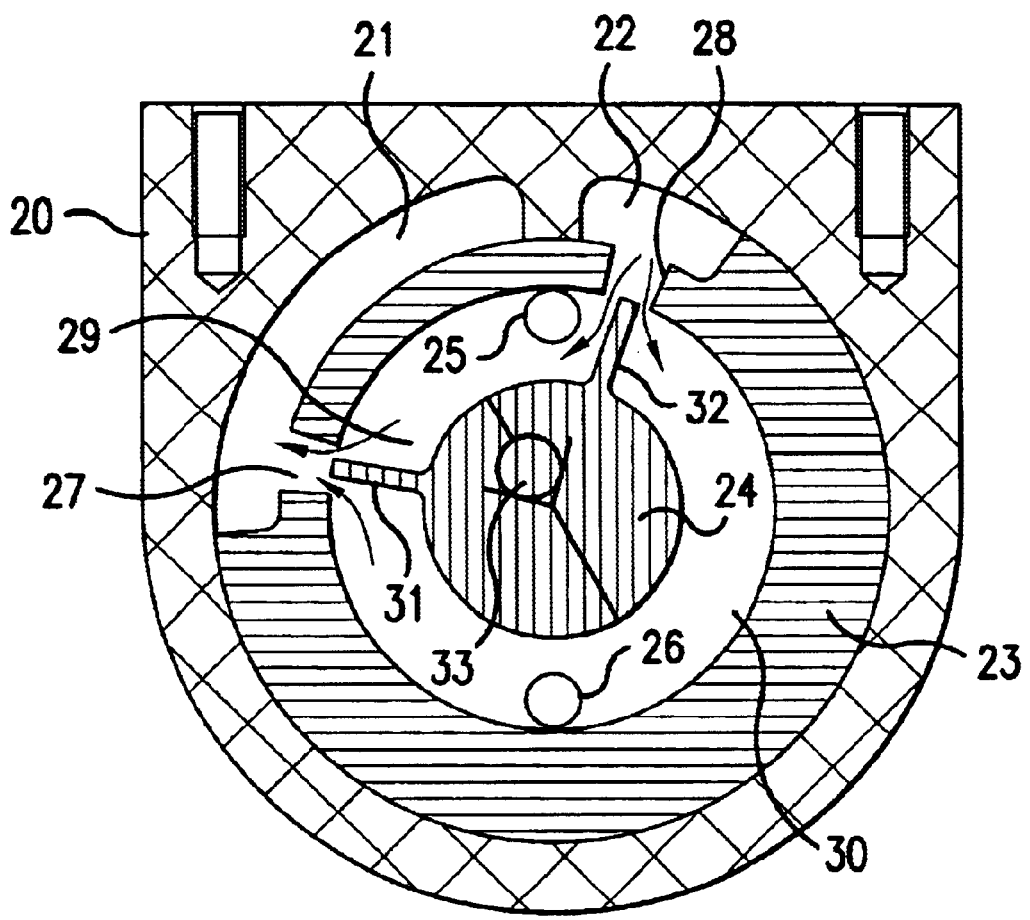
FIG. 4 is a cross sectional view showing a substantial part to illustrate an operation of one preferred embodiment of the present invention.

Then, in the case that the steering wheel 16 is gradually turned left, the C-ring 36 is not deformed due to a low steering force, and the rotary cylinder 23 and the spool changing-over member 24 are integrally rotated. With such an arrangement as above, as shown in FIG. 4, the rotary cylinder 23 and the spool changing-over member 24 are turned in a leftward direction while holding the state shown in FIG. 5, resulting in that no assisting force is produced even under this state. This is an operating state in the case that the steering angle is low and no assisting force is required.

Figure 7:
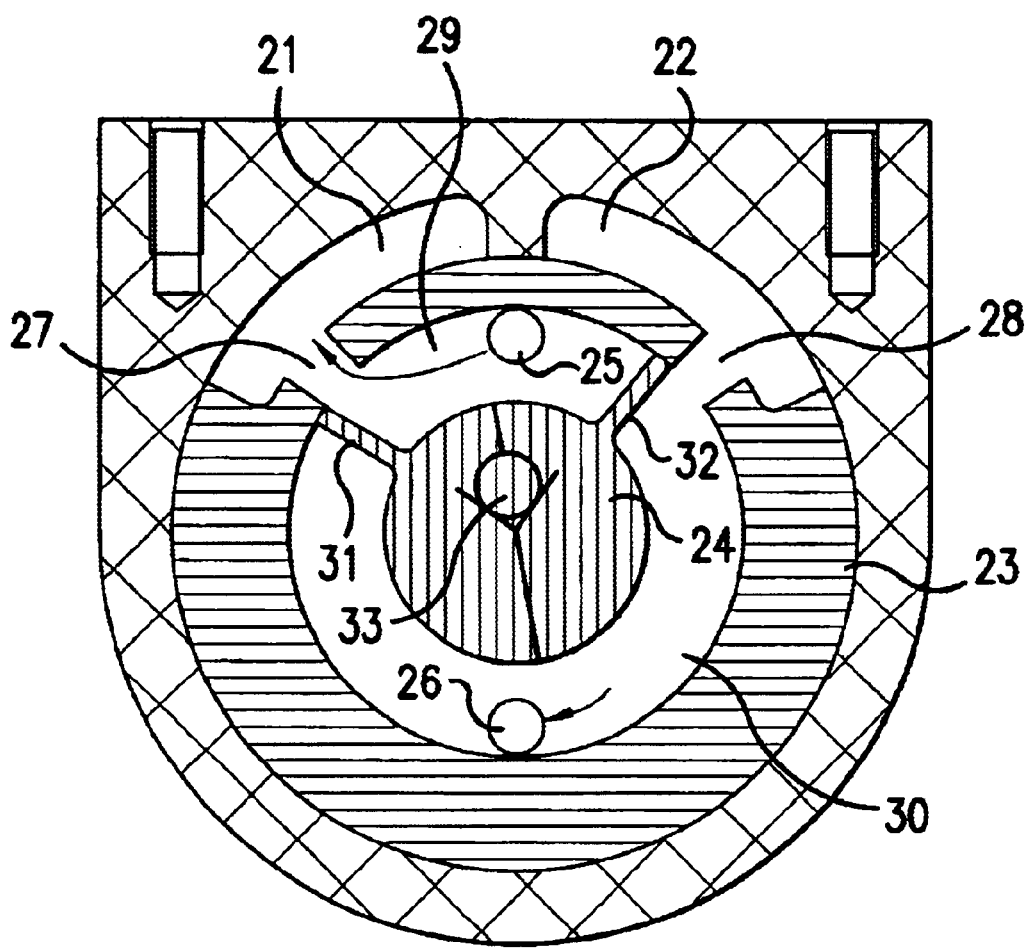
FIG. 7 is a cross sectional view showing a substantial part to illustrate an operation of one preferred embodiment of the present invention.

When the steering is carried out under a large steering angle, its steering force is increased, although in the case that the steering force is larger than a torque set by the C-ring 36, it is resiliently deformed such that the diameter of the C-ring 36 is expanded, resulting in that the rotary cylinder 23 and the spool changing-over member 24 are rotated relatively as shown in FIG. 7.

With such an arrangement as above, the partition walls 31, 32 are displaced from the communicating holes 27, 28 to cause one operating oil passage 29 to be connected only with the left side operating oil chamber 21 and further the other operating oil passage 30 to be connected only with the right side operating oil chamber 22.

With such an arrangement as above, operating oil is supplied to the left side operating oil chamber 21 from the operating oil supply hole 25 through the operating oil passage 29, resulting in that pressure within the left side operating oil chamber 21 is increased, and a leftward assisting force acts on the rotary cylinder 23 and the steering force is reduced.

Figure 6:
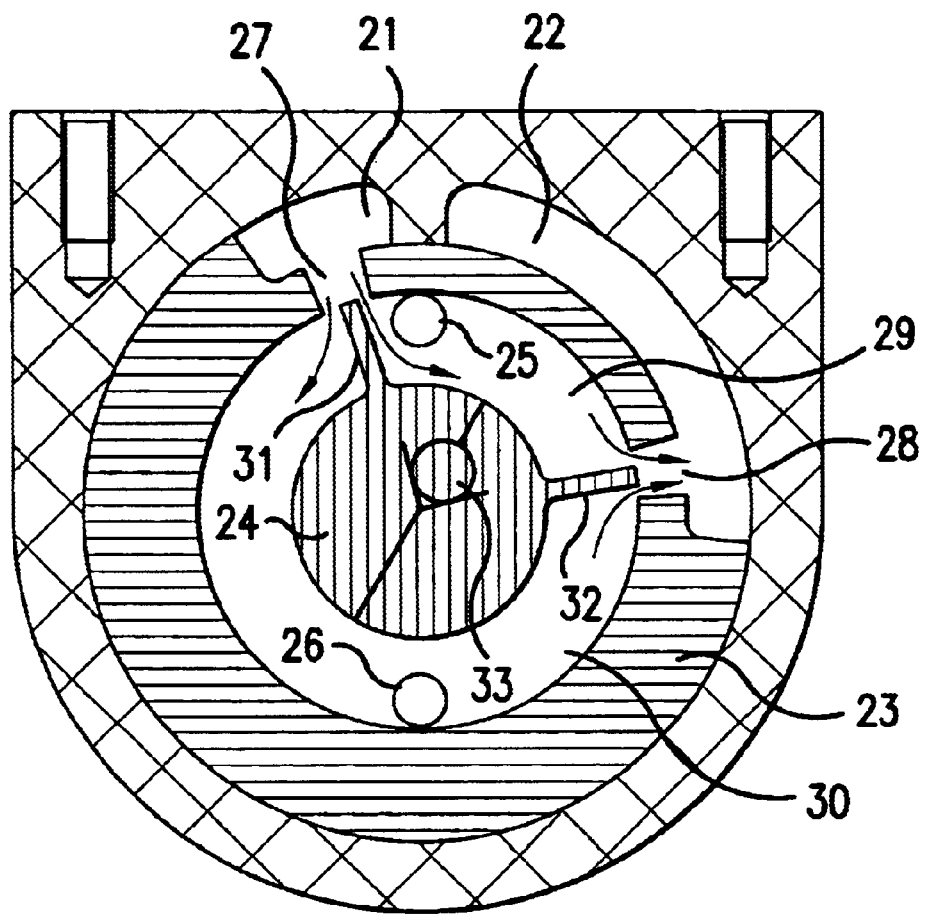
FIG. 6 is a cross sectional view showing a substantial part to illustrate an operation of one preferred embodiment of the present invention.
Figure 8:
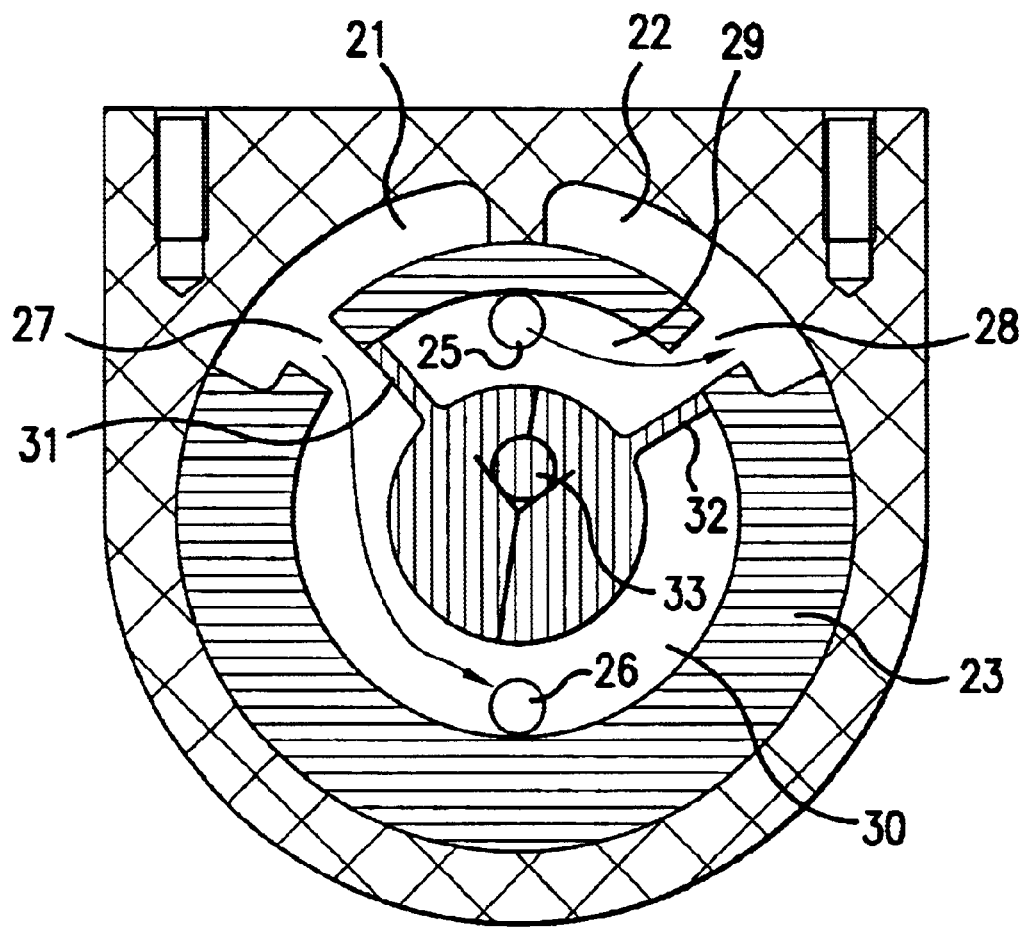
FIG. 8 is a cross sectional view showing a substantial part to illustrate an operation of one preferred embodiment of the present invention.
Figure 9:
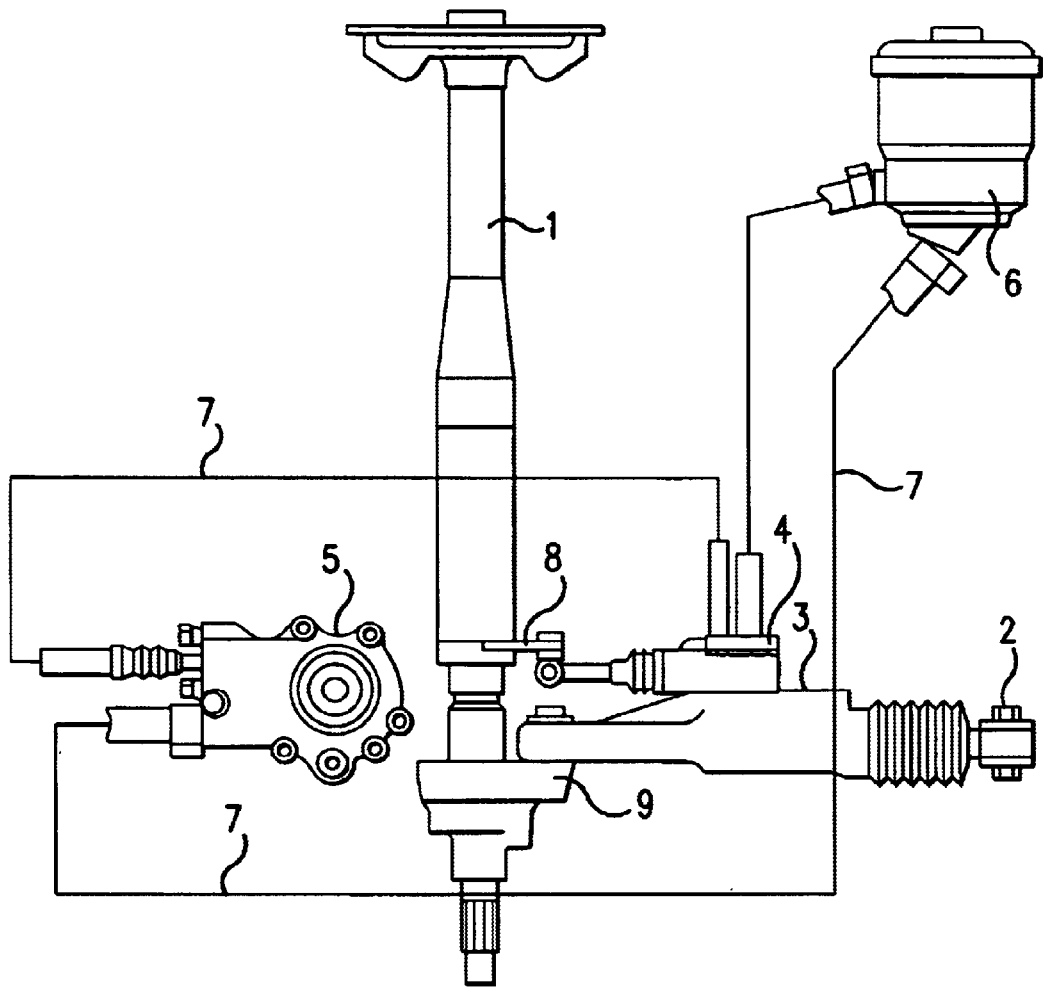
FIG. 9 is a schematic configuration view showing a power steering device of the background art.

Such a function can be similarly attained also in the rightward steering operation. In FIGS. 6 and 8 a positional relation between the rotary cylinder 23 and the spool changing-over member 24 is illustrated. In addition, when a kick-back or the like occurs during the steering operation, the operating oil flows through the spool changing-over member 24 under an action of the check valve 33 to cause a shock of the kick-back to be damped.

As described above, in accordance with the power steering device 18 of this preferred embodiment, the entire device is arranged on an axis of the steering shaft 14, thereby it is possible to make a compact steering device and eliminate an occupied space in the chassis. In addition, since the device can be assembled concurrently when the steering shaft 14 is assembled, its assembling work becomes convenient.

Various kinds of shapes or sizes of each of the components indicated in the aforesaid preferred embodiment are mere examples and they can be modified in various manners in response to a request in design. For example, since the operating oil supply hole 25 or operating oil discharging hole 26 described above is fixed, the operating oil supplying passage can be constituted by a pipe and its durability can be improved. Further, the supply hole 25 or discharging hole 26 is closed to cause the operating oil to be enclosed therein, resulting in that it becomes possible to apply it as a steering damper under utilization of viscosity of the operating oil.

As described above, in accordance with the power steering device of the present invention, the power steering device is mounted coaxially on the steering shaft, and it becomes possible to make a compact device and further an occupied space on the chassis is sufficiently narrow. In addition, since the device can be assembled concurrent with the assembling of the steering shaft, its assembling operation becomes convenient and its connecting portions are less in number and an assembling accuracy can be improved.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A power steering device installed between a steering shaft rotatably installed at a chassis frame and a steering wheel connected to the steering shaft, the power steering device comprising:
    a cylindrical holder coaxially arranged on said steering shaft;
    a cylindrical rotary cylinder coaxially and rotatably installed in the holder and forming two oil chambers spaced apart in a circumferential direction between the cylindrical rotary cylinder and an inner surface of the holder; and
    a spool changing-over member coaxially and rotatably inserted in the rotary cylinder and connected to said steering wheel, wherein
        said holder is provided with an operating oil supply hole and an operating oil discharging hole,
        said rotary cylinder is formed with a pair of communicating holes between each of said oil chambers and an inside of said rotary cylinder,
        said spool changing-over member is formed with operating oil passages where a space part between the spool changing-over member and an inner circumferential surface of said rotary cylinder is divided into two segments in a circumferential direction and connected with said supply holes and discharging holes, and
        a pair of partition walls are provided for changing-over communicating state between said pair of operating oil passages and said pair of communicating holes under a relative rotation with said rotary cylinder.

2. The power steering device according to claim 1, wherein said both operating oil passages are connected with said spool changing-over member, and a check valve is provided for preventing a flow of operating oil directed from the operating oil passages connected with the supply hole for said operating oil and directed toward the operating oil passage connected with the discharging hole for said operating oil.

3. The power steering device according to claim 2, wherein a differential mechanism is provided between said rotary cylinder and the spool changing-over member for integrally rotating said rotary cylinder and the spool changing-over member when a steering force applied to said steering shaft is low, and for allowing a relative rotation between said rotary cylinder and the spool changing-over member when said steering force is larger than a predetermined value.

4. The power steering device according to claim 1, wherein a differential mechanism is provided between said rotary cylinder and the spool changing-over member for integrally rotating said rotary cylinder and the spool changing-over member when a steering force applied to said steering shaft is low, and for allowing a relative rotation between said rotary cylinder and the spool changing-over member when said steering force is larger than a predetermined value.

5. A power steering device comprising:
    a cylindrical holder;
    a cylindrical rotary cylinder located coaxially in said cylindrical holder and rotatable with respect to said cylindrical holder; and
    a spool changing-over member located coaxially in said cylindrical rotary cylinder and rotatable with respect to said cylindrical rotary cylinder,
    wherein said cylindrical holder includes an operating oil supply hole and an operating oil discharging hole.

6. The power steering device according to claim 5, further comprising a first oil chamber and a second oil chamber located between said cylindrical rotary cylinder and an inner surface of said cylindrical holder.

7. The power steering device according to claim 6, wherein said first and second oil chambers are spaced apart in a circumferential direction from one another.

8. The power steering device according to claim 5, further comprising an input shaft connected to said spool changing-over member.

9. The power steering device according to claim 8, further comprising a steering member attached to said input shaft.

10. The power steering device according to claim 8, further comprising an output shaft connected to said cylindrical rotary cylinder.

11. The power steering device according to claim 5, wherein said operating oil supply hole and said operating oil discharging hole are located on a circumference of said spool changing-over member.

12. A power steering device comprising:
    a cylindrical holder;
    a cylindrical rotary cylinder located coaxially in said cylindrical holder and rotatable with respect to said cylindrical holder;
    a spool changing-over member located coaxially in said cylindrical rotary cylinder and rotatable with respect to said cylindrical rotary cylinder;
    a first oil chamber and a second oil chamber located between said cylindrical rotary cylinder and an inner surface of said cylindrical holder; and
    a pair of communicating holes located in said cylindrical rotary cylinder for permitting oil to pass between each of said first and second oil chambers and an inside of said cylindrical rotary cylinder.

13. A power steering device comprising:
    a cylindrical holder;
    a cylindrical rotary cylinder located coaxially in said cylindrical holder and rotatable with respect to said cylindrical holder;
    a spool changing-over member located coaxially in said cylindrical rotary cylinder and rotatable with respect to said cylindrical rotary cylinder; and
    a first oil passage and a second oil passage located between said spool changing-over member and an inner surface of said cylindrical rotary cylinder.

14. The power steering device according to claim 13, wherein said first and second oil passages are spaced apart in a circumferential direction from one another.

15. The power steering device according to claim 13, wherein said cylindrical holder includes an operating oil supply hole connected with said first oil passage, and an operating oil discharging hole connected with said second oil passage.

16. The power steering device according to claim 13, wherein said spool changing-over member includes a pair of partition walls for separating said first oil passage from said second oil passage.

17. A power steering device comprising:

a cylindrical holder;

a cylindrical rotary cylinder located coaxially in said cylindrical holder and rotatable with respect to said cylindrical holder;

a spool changing-over member located coaxially in said cylindrical rotary cylinder and rotatable with respect to said cylindrical rotary cylinder;

a first oil chamber and a second oil chamber located between said cylindrical rotary cylinder and an inner surface of said cylindrical holder, said first and second oil chambers being spaced apart in a circumferential direction from one another; and a pair of communicating holes located in said cylindrical rotary cylinder for permitting oil to pass between each of said first and second oil chambers and an inside of said cylindrical rotary cylinder.

18. The power steering device according to claim 17, further comprising a first oil passage and a second oil passage located between said spool changing-over member and an inner surface of said cylindrical rotary cylinder, said first and second oil passages being spaced apart in a circumferential direction from one another, wherein said spool changing-over member includes a pair of partition walls for separating said first oil passage from said second oil passage.

19. The power steering device according to claim 18, wherein said cylindrical holder includes an operating oil supply hole connected with said first oil passage, and an operating oil discharging hole connected with said second oil passage.

20. The power steering device according to claim 19, further comprising:

an input shaft connected to said spool changing-over member;

a steering member attached to said input shaft; and an output shaft connected to said cylindrical rotary cylinder.

* * * * *